United States Patent [19]

Jones et al.

[11] 3,723,396

[45] Mar. 27, 1973

[54] CATALYTIC PRODUCTION OF POLYAMIDES FROM AROMATIC DIAMINES

[75] Inventors: Michael Edward Benet Jones; Graham Jarrett, both of Runcorn, England

[73] Assignee: Imperial Chemical Industries Limited, London, England

[22] Filed: Apr. 19, 1971

[21] Appl. No.: 135,500

Related U.S. Application Data

[63] Continuation of Ser. No. 839,075, July 3, 1969, abandoned.

[52] U.S. Cl..............260/78 R, 260/2.5 N, 260/78 S
[51] Int. Cl. ..............................................C08g 20/20
[58] Field of Search ....................260/78 R, 2.5 N

[56] References Cited

UNITED STATES PATENTS

| | | | |
|---|---|---|---|
| 2,244,192 | 6/1941 | Flory | 260/78 R |
| 3,173,898 | 3/1965 | Sum | 260/78 R |
| 3,206,438 | 9/1965 | Jamison | 260/78 R |
| 3,322,728 | 5/1967 | Hill et al. | 260/78 R |
| 3,505,296 | 4/1970 | Burrows et al. | 260/78 R |

Primary Examiner—Harold D. Anderson
Attorney—Cushman, Darby & Cushman

[57] ABSTRACT

A method of producing a polyamide which is of sufficiently high molecular weight to be used in moulding applications or for film or fiber formation from an aromatic diamine, by a high temperature melt procedure comprises heating a diamine component comprising at least one bis(aminophenyl)sulphone with a diacid component comprising at least one dicarboxylic acid at a temperature of from 160° to 300°C under an inert atmosphere and in the presence of a catalytic amount of a salt of hypophosphorous acid and an organic base having a $pK_a$ of less than 3, the salt being put in the reaction mixture before the latter reaches 150°C. Preferably the organic base is the bis(aminophenyl)sulphone used as the diamine component and the salt is formed in situ by addition of the hypophosphorous acid or a compound or compounds which will produce this acid in the reaction mixture.

7 Claims, No Drawings

CATALYTIC PRODUCTION OF POLYAMIDES FROM AROMATIC DIAMINES

This application is a continuation of Ser. No. 839,075, filed July 3, 1969, now abandoned.

This invention relates to the production of mouldable or fiber or film- forming polyamides from bis(aminophenyl) sulphones and in particular it relates to their production by a high temperature melt procedure.

From the earliest days of polyamides, it has been recognized that the production of commercially useful polyamides from aromatic diamines by high temperature melt procedure has presented special problems because of their much slower reaction with dicarboxylic acids compared with aliphatic diamines and because their polyamides with dicarboxylic acids tend to undergo thermal degradation at the temperatures required for a high temperature melt process. Thus, the rate of decomposition tends to offset the rate of polymerization before the required molecular weight for moulding applications or film or fiber formation has been attained.

Some proposals have been made for alleviating this problem but to our knowledge no commercial process for the production of polyamides from aromatic diamines by high temperature melt procedures has ever been developed. One proposal, found in British Pat. specification 543843, has been to add to the polycondensation mixture an acid catalyst having a dissociation constant of more than $2 \times 10^{-3}$, for example phosphoric, sulphuric, hydrochloric or p-toluene sulphonic acid. However, attempts to apply the use of any of these catalysts to the production of polyamides from bis(aminophenyl) sulphones have either failed to provide products of adequate molecular weight because the rate of reaction has not been increased sufficiently to offset the competing decomposition reaction, or else the required molecular weight has only been achieved by use of uneconomically extended reaction times leading to consequent loss of quality, e.g. discoloration, of the product.

More recently, manganous hypophosphite has been proposed for the same purpose in the specification of U.S. Pat. No. 3211705, but similar results are obtained with this catalyst when applied to the production of polyamides from bis(aminophenyl)sulphones. Moreover, the use of this catalyst tends to leave metallic residues in the polymeric product and this can be undesirable for some applications.

We have now found that polyamides having the necessary molecular weight for moulding applications and/or for film and/or fiber formation may be obtained from bis(aminophenyl) sulphonesby high temperature melt procedures by use as catalyst of a salt of hypophosphorous acid ($H_3PO_2$) and an organic base having a $pK_a$ of less than 3.0 and preferably less than 2.5, where $K_a$ is the dissociation constant of a base, B, in terms of the equilibrium of the base and its conjugate acid, $BH^+$, with a solvated proton:

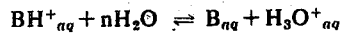

According to the present invention, therefore, we provide a method of producing a polyamide suitable for use in moulding applications or for conversion to film or fiber which comprises heating a reaction mixture comprising a diamine component comprising at least one bis(aminophenyl) sulphone or amide forming derivative thereof and a substantially equimolar amount of a diacid component comprising at least one dicarboxylic acid or amide forming derivative thereof at a temperature of from 160° to 300°C under an inert atmosphere and in the presence of a catalytic amount of a salt of hypophosphorous acid and an organic base having a $pK_a$ of less than 3.0, and preferably less than 2.5, which salt is present in the reaction mixture before the latter reaches 150°C.

Most preferably, the organic base is a compound having the formula $RSO_2ArNH_2$ where R is a monovalent hydrocarbon group or an amino-substituted derivative thereof, and Ar is a divalent aromatic group, preferably phenylene. Very suitably, the base is the same bis(aminophenyl)sulphone which is to be used in the polycondensation to form the polyamide. In this case, the salt need not be preformed before addition to the reaction mixture but may be formed in situ, e.g. by including in the reaction mixture hypophosphorous acid or a compound or mixture of compounds which will produce hypophosphorous acid in the polymerization mixture before same reaches 150°C.

Examples of other bases whose salts with hypophosphorous acid may be used in the polymerization according to our invention include, for example, 2- and 4-acetylanilines, 4(p-aminobenzoyl)aniline, 4-benzoylaniline, 3- and 4-methylsulphonylanilines, haloanilines, cyanoanilines and nitroanilines.

The dicarboxylic acid used in the polycondensation is preferably aliphatic, and especially adipic acid, sebacic acid, azelaic acid, pimelic acid, suberic acid or other $\alpha,\omega$-polymethylene dicarboxylic acid, preferably having from six to 16 carbon atoms in all. A mixture of two or more acids may be used if desired and the acid or acids may be replaced by their diphenyl esters, if desired.

The bis(aminophenyl)sulphone to be polycondensed may be,for example, 4,4'-, 3,3'-, or 3,4'-diaminodiphenyl sulphone. Mixtures of two or more bis(aminophenyl)sulphones may be used, if desired, and it is preferred that the bis(aminophenyl)sulphone form substantially all of the diamine component.

The diamine and dicarboxylic acid components of the mixture should be present in equimolar or substantially equimolar proportions where very high molecular weight products are desired. However, a small excess of either, e.g. up to 5 mole percent, may be used without the molecular weight falling below the desired level; usually equivalent to a reduced viscosity (measured on a solution of 1 g of polymer in 100 ml. of a 5 weight percent solution of lithium chloride in dimethylformamide) of at least 0.8.

The catalyst or precursor therefor, may be mixed with either of the polyamide forming components of the polymerization mixture before the two components are mixed together or it may be added to the mixture. It may be added before or after heating has commenced but it must be added before the mixture attains 150°C. If the catalyst or precursor is added to the mixture with the latter above this temperature, little or no benefit will be obtained.

Only very small quantities of catalyst are required to gain benefit therefrom, for example equivalent to from 0.01 to 1 part of hypophosphorous acid per 100 parts by weight of the mixture of diamine and diacid. Smaller or larger amounts may be used if desired but below 0.005 part the effect may be small and above about 3 parts little or no further benefit is likely to be obtained.

A conventional melt polymerization procedure for polyamides may be used. Thus, for example, the diamine component, dicarboxylic acid component and catalyst (or precursor therefor, e.g. hypophosphoric acid) may be charged simultaneously or in any order to a suitable reaction vessel from which the air has already been, or is thereafter, removed, and are then heated at the appropriate reaction temperature, if necessary with the application of vacuum, until the desired molecular weight has been achieved. Suitably, the reaction is carried out under nitrogen or other inert gas. Polymer formation will usually be accompanied by an increase in the viscosity of the melt and the degree of polymerization may be determined by measuring the melt viscosity. As the polymerization proceeds, it may be found desirable or even necessary to raise the temperature of the mixture in order to maintain it in molten form. The polymerization temperature required will depend to some extent on the nature of the dicarboxylic acid component of the polymerizable mixture but in general temperatures within the range 160° to 300°C will be found suitable. Preferred temperatures generally lie in the range 220° to 270°C.

Preferably, at least the latter part of the reaction is effected under vacuum in order to aid the removal of the by-products of the polycondensation. Preferably, also, the reaction is effected in two stages, the first of which is effected at a temperature of 160° to 240°C, preferably under reflux so as to reduce any loss of acid by distillation, and the second of which is effected at a temperature which is higher than that of the first stage and is generally in the range 200° to 270°C. Preferably, the second stage is effected under a vacuum equivalent to an absolute pressure of 1.0 mm of mercury absolute or less.

Where $\alpha,\omega$-polymethylene dicarboxylic acids having from six to 16 carbon atoms in all are polycondensed with the bis(aminophenyl) sulphones, the polyamide products of the invention are generally mouldable amorphous materials which may be injection, compression, or transfer-moulded, or extruded into shaped articles, e.g. fibers, films and thick-walled articles. The products from aromatic dicarboxylic acids are generally convertible to films, fibers and coatings from solution in suitable solvents.

Before shaping, the polymers may be mixed if desired with any of the usual polymer additives, e.g. heat and light stabilizers, lubricants, fillers, mould-release agents and plasticizers, and may be blended with other polymeric materials, natural or synthetic.

The invention is illustrated by the following Examples. The 4,4'-diaminodiphenyl sulphone used in the Examples is available from I.C.I. Ltd. under the trade name of "Dapsone B.P.." The azelaic acid used was Emery Chemical Company's "Emerox 1144."

EXAMPLE 1

The salt of hypophosphorous acid and bis(4-aminophenyl)sulphone was prepared by dissolving 5 parts of the diamine in a 50 percent aqueous solution of the acid; the amount of acid used being chosen to be about two moles/mole of diamine. The reaction was exothermic. The mixture was then cooled in ice whereupon the salt crystallized. It was dried under high vacuum at room temperature and found to have a melting point (with decomposition) of 104°–107°C. Elemental analysis showed a phosphorous content of 16.24 percent and a nitrogen content of 7.45 percent by weight. Theory requires 16.3 percent and 7.4 percent respectively for $C_{12}H_{16}O_6N_2P_2S$.

24.83 Parts (100 molar parts) of dry bis(4-aminophenyl)sulphone and 19.20 parts (102 molar parts) of azelaic acid were mixed together in a polymerization tube under an atmosphere of nitrogen. 0.1256 Part of the salt was added and the mixture heated in a fluidized sand bath at 188°C. After melting, the reactants were agitated by passing a rapid current of nitrogen through the mixture.

Heating was continued at this temperature for 30 minutes during which time some water and a little azelaic acid distilled off and the viscosities of the mixture increased. The temperature was then progressively raised to 220°C over 1¼ hours. Vacuum was then gradually applied as the temperature was raised to 260°C at which point a final vacuum of 0.3 mm of Hg absolute pressure was achieved. A slow passage of nitrogen through the melt was continued for a further 2 hours with the temperature maintained at 260°C. After cooling, a rigid tough polymer foam was recovered which had a reduced viscosity of 1.3 (measured on a solution of 1 g of polymer in 100 ml of 5 wt % LiCl in dimethylformamide at 25°C).

By way of comparison, the use of the corresponding salt from aniline ($pK_a \sim 4$) yielded a polymer having a reduced viscosity of 0.39 and the use of the salt from 2,2-bis(4-aminophenyl) propane produced a similar result.

EXAMPLE 2

The polymerization process of Example 1 was repeated but using 0.0514 part of a 50 weight percent aqueous solution of hypophosphorous acid ($H_3PO_2$). The time for heating to 220°C was raised from 75 to 90 minutes and the time at 260°C was reduced to 1½ hours.

The final product was a rigid, tough foam.

The reduced viscosity, measured as described in Example 1, was 2.22 at 25°C.

Films obtained by compression moulding at 250°C for 3 minutes were transparent, strong and tough. No crystallinity was detected by X-ray examination of the films.

By way of comparison, two further melt polymerizations were effected, one in the absence of any catalyst and the other using manganous hypophosphite as catalyst.

In each polymerization, 24.80 parts of bis(4-aminophenyl) sulphone and 18.82 parts of azelaic acid were heated together in a polymerization tube to 185°C under an atmosphere of nitrogen and this temperature was maintained for 80 minutes during which time a little water and some acid distilled off. The melt was agitated by passing a rapid current of nitrogen through it. The temperature was then raised progressively to 220°C and held there for a further 70 minutes. The temperature was then raised to 260°C and the pressure reduced to 0.2 mm of Hg absolute, and polymerization was continued under these conditions for 6 hours during which time there was a slow increase in the viscosity of the melt. At the end of this period, the product was cooled and removed from the polymerization tube.

The reduced viscosity of the polymer obtained from the uncatlyzed melt polycondensation was 0.18 (measured as described above). In the second case, where 0.65 part of manganous hypophosphite was included in the polymerizable mixture, the reduced viscosity of the product was 0.43.

In a series of further comparative experiments hypophosphorous acid was replaced by hydrochloric acid, sulphuric acid and p-toluene sulphonic acid respectively, the other conditions being unchanged. In all cases, the rates of polymerization were slower than in the case of hypophosphorous acid and it was not possible to obtain products of adequately high molecular weight.

EXAMPLE 3

49.66 Parts (100 molar parts) of bis(4-aminophenyl)sulphone and 37.70 parts (100 molar parts) of azelaic acid were mixed with 0.103 part of a 50 percent aqueous solution of hypophosphorous acid and heated in a polymerization tube under reflux at 189°C under a slow stream of nitrogen for 1½ hours. The water of reaction which was evolved was returned to the reaction zone, carrying with it any free azelaic acid which had been lost. The viscosity of the melt increased during this time and evolution of azelaic acid ceased. The temperature was raised to 240°C and water gradually distilled off over a 60 minute period. The temperature was then raised further to 265°C and a vacuum of 0.3 mm. of Hg absolute pressure applied, the reaction being continued under these conditions for a further 2½ hours. The viscosity increased rapidly on application of vacuum, finally becoming so viscous that nitrogen gas could not be drawn through the melt.

After cooling, the foamed reaction mass was removed from the polymerization tube and powdered. The reduced viscosity, measured as described in Example 1, was 1.85. The melt viscosity of this polymer, measured on a Weissenburg Rheogoniometer at 270°C and a shear rate of 1.78 sec.$^{-1}$, was $13 \times 10^3$ poise and was unchanged after 15 minutes at this temperature.

EXAMPLE 4

24.83 Parts of bis(4-aminophenyl)sulphone and 23.03 parts (an exactly equimolar amount) of decamethylene dicarboxylic acid were mixed with 0.05 part of a 50 percent aqueous solution of hypophosphorous acid and reacted as in Example 3 to give a polymer having a reduced viscosity, as measured in Example 1, of 1.57.

EXAMPLE 5

24.8 Parts of bis(3-aminophenyl)sulphone (melting point 174°–175°C), 14.7 parts of polymer grade adipic acid and 0.033 part of a 50 percent aqueous solution of hypophosphorous acid were mixed together at room temperature under nitrogen and then subjected to the following sequence, the mixture being maintained under nitrogen throughout:
i. heated to 185°C and maintained there for 15 minutes,
ii. raised to 220°C and maintained there for 90 minutes,
iii. pressure reduced to 0.2 mm of Hg absolute and temperature raised to 260°C,
iv. 260°C maintained for 75 minutes.

On cooling, a polyamide was recovered which was soluble in hot formic acid, cold dimethylformamide, cold dimethyl sulphoxide and cold concentrated sulphuric acid. Its reduced viscosity (measured as described in Example 1) was 1.05 and its second order glass/rubber transition temperature (measured by differential thermal analysis) was 140°C.

X-ray examination showed the polymer to be amorphous.

Its melt viscosity at 270°C and $10^{-2}$ seconds$^{-1}$ was $10^4$ poises (measured on a Weissenburg Rheogoniometer).

EXAMPLE 6

The process of Example 5 was repeated using 4.75 parts of the diamine, 3.68 parts of azelaic acid and 0.009 part of the aqueous solution of hypophosphorous acid. Stage (iv) of the treatment was extended to 135 minutes.

The product had a melt viscosity of $6 \times 10^6$ poises at 270°C and $10^{-2}$ (measured on a Weissenburg Rheogoniometer) indicating that it was of very high molecular weight. Differential thermal analysis showed a second order glass/rubber transition temperature at 125°C, and X-ray examination showed the polymer to be amorphous. The second order glass/rubber transition temperature at 125°C was also observed using dynamic mechanical techniques with a torsion pendulum.

0.005 inch thick films were prepared by compression moulding the dried polymer at 250°C. These films were strong and transparent and could be creased repeatedly without fracture, and X-ray examination showed that no crystallization had occurred during compression moulding. Samples of the film that had been immersed in refluxing toluene for 4 hours, however, exhibited slight crystallinity on X-ray examination.

EXAMPLE 7

24.83 Parts of bis(4-aminophenyl)sulphone, 16.0 parts of pimelic acid and 0.099 part of a 50 percent aqueous solution of hypiphosphorous acid were mixed at room temperature under nitrogen and the mixture was then subjected to the following series of treatments, all under nitrogen.
i. heated to 180°C and maintained there for 30 minutes at atmospheric pressure,
ii. raised to 200°C and maintained there for 45 minutes at atmospheric pressure,
iii. raised to 220°C and maintained there for 25 minutes at atmosphere pressure, iv. pressure reduced to 0.1 mm of Hg absolute and temperature raised to 260°C, v. temperature maintained at 260°C for 2 hours.

After cooling, a polymer was recovered having a reduced viscosity (measured as described in Example 1) of 1.06.

EXAMPLE 8

Two hundred and forty-eight Parts of bis(3-aminophenyl)sulphone, 23.2 parts of decamethylene dicarboxylic acid and 0.04 part of a 50 percent aqueous solution of hypophosphorous acid were reacted as described in Example 5 to give a polymer having a reduced viscosity (measured as described in Example 1) of 0.87. X-ray examination of the product showed it to be amorphous and differential thermal analysis indicated a second order glass/rubber transition temperature at 107°C.

EXAMPLE 9

24.8 Parts of bis(4-aminophenyl)sulphone, 15.2 parts of azelaic acid and 3.3 parts of isophthalic acid were mixed by tumble-blending the dry powders. 0.125 part of a 50 weight percent aqueous solution of hypophosphorous acid was added and tumble blended with the mixture for 5 minutes. The mixture was then heated to 180°C under a stream of dry nitrogen after 15 minutes the temperature was raised to 220°C. Water distilled off over a period of 40 minutes at this temperature and then the pressure was gradually reduced over a period of 25 minutes to 0.2 mm of Hg absolute. The temperature was then raised to 250°C and maintained there for 2¼ hours. The mass was then cooled and the polymer recovered as a tough pale yellow polymeric foam having a reduced viscosity, measured as in Example 1, of 2.13. X-ray examination showed the polymer to be amorphous and its glass/rubber transition temperature was 193°C.

EXAMPLE 10

A mixture of 24.8 parts of bis(4-aminophenyl)sulphone, 20.2 parts of sebacic acid and 0.102 part of a 50 weight percent aqueous solution of hypophosphorous acid was heated to 180°C under a slow stream of nitrogen in a polymerization tube. After a few minutes, a homogeneous pale yellow melt had formed which was stirred by the passage of nitrogen. The temperature was maintained at 180°C for 30 minutes during which time water steadily distilled over. The temperature was then raised to 200°C for 45 minutes and then to 220°C for 25 minutes. At this time vacuum was gradually applied as the temperature was raised to 260°C. After 1 hour at 260°C under a vacuum corresponding to an absolute pressure of 0.15 mm of Hg. the polymer had formed a highly viscous foam. The heat was removed and the product recovered. Its reduced viscosity, measured, as in Example 1, was 1.27.

We claim:

1. A method of producing a fiber or film-forming or mouldable polyamide which comprises heating a reaction mixture in which the principal diamine component is at least one bis(aminophenyl) sulphone and a substantially equimolar amount of at least one $\alpha,\omega$-polymethylene dicarboxylic acid having six to sixteen carbon atoms in all at a temperature of from 160° to 300°C. under an inert atmosphere and in the presence of, as catalyst, a salt of hypophosphorous acid and bis(aminophenyl)sulphone having a $pK_a$ of less than 3.0, said salt being present in the reaction mixture before the latter reaches 150°C.

2. A method as claimed in claim 1 in which the bis(aminophenyl)sulphone portion of the catalyst has a $pK_a$ of less than 2.5.

3. A method as claimed in claim 1 in which the bis(aminophenyl)sulphone portion of the catalyst is bis (4- or 3-aminophenyl)sulphone.

4. A method as claimed in claim 1 in which the salt is present in an amount equivalent to from 0.005 to 3 parts of hypophosphorous acid per 100 parts of the mixture of diamine and diacid.

5. A method as claimed in claim 4 in which the salt is present in an amount equivalent to from 0.01 to 1 part of hypophosphorous acid per 100 parts of the mixture of diamine and diacid.

6. A method as claimed in claim 1 in which the reaction mixture is heated at a temperature of from 220° to 270°C.

7. A method as claimed in claim 6 in which the reaction mixture is subjected to a first stage at which it is heated to a temperature of from 160° to 240°C.

* * * * *